United States Patent [19]

Van Meter, deceased et al.

[11] 4,326,407
[45] Apr. 27, 1982

[54] LEAK TEST TOOLS

[76] Inventors: Homer Van Meter, deceased, late of Sun City Center, Fla.; by Geraldine S. Van Meter, executrix, 1628 Vincennes Dr., Sun City Center, Fla. 33570

[21] Appl. No.: 182,434

[22] Filed: Aug. 29, 1980

[51] Int. Cl.³ .................. G01M 3/08; F16L 37/18
[52] U.S. Cl. .................. 73/49.1; 285/102; 285/312; 285/323; 285/328; 285/331; 285/346
[58] Field of Search .............. 285/312, 306, 323, 346, 285/328, 104, 101, 105, 102, 338, 331, 309, 310, 311; 73/49.1, 49.5

[56] References Cited

U.S. PATENT DOCUMENTS

| | | | |
|---|---|---|---|
| 1,340,785 | 5/1920 | McMullin | 285/312 X |
| 3,738,688 | 6/1973 | Racine | 285/312 |
| 3,779,587 | 12/1973 | Racine | 285/312 |
| 3,868,132 | 2/1975 | Racine | 285/312 |
| 3,923,325 | 12/1975 | Slater | 285/312 |
| 4,154,465 | 5/1979 | Van Meter | 285/312 |
| 4,188,051 | 2/1980 | Burge | 285/104 |
| 4,225,159 | 9/1980 | Van Meter | 285/312 |

*Primary Examiner*—Dave W. Arola

[57] ABSTRACT

A fitting for mounting to the ends of smooth wall tubes, particularly, expanded end tubes and beaded or barbed end tubes. The fitting grips behind the expansion or beaded end on the tube and seals on the tube outer diameter. The fitting also has a pressure assist design that furnishes increased sealing and gripping action with increase in sealing pressure.

8 Claims, 5 Drawing Figures

LEAK TEST TOOLS

BACKGROUND AND BRIEF DESCRIPTION OF THE PRESENT INVENTION

This invention relates to a fitting for mounting to the ends of smooth wall tubes, particularly, expanded end tubes and beaded or barbed end tubes.

The fitting of the present invention is generally relates to those types of fittings disclosed in U.S. Pat. Nos. 3,738,688; 3,779,587; 3,868,132; and 4,154,465.

The fittings disclosed in some of the above-mentioned U.S. patents are mounted to the end of a smooth wall tube by, generally, compressing a seal against the outer diameter of the tube upon translation of a ram element within the housing thereof. Others of these fittings grip on the outside diameter of the tube and also seal on the inside diameter. While these fittings function exceptionally well in most cases, difficulties may be encountered in affixing these fittings to expanded end tubes and beaded or barbed end tubes. The fittings of the present invention are specifically designed for use with tubes of these latter described types. In particular, in the case of expanded end tubes, the fitting is designed to grip behind the expansion and to seal on the tube outer diameter. The fitting thus is securely affixed to the tube such as to allow for full flow of fluid when charging or evacuating compressor tubing or expanded end headers on condensor or evaporator systems. In the case of beaded end tubes, the fittings provide maximum safety characteristics through gripping behind the beaded section of the tubes with sealing on the outside tube diameter. In the case of barbed end tubes, the fittings grip behind and between the barbed section of the tubes. In each case also, the fittings have a pressure assist design that furnishes increased sealing and gripping action with increase in sealing pressure. The fittings, furthermore, will accept wide variations in expanded end lengths and lengths from bead or barb to the end of the tube.

Accordingly, it is an object of the present invention to provide improved fittings for mounting to the ends of smooth wall tubes, particularly smooth wall tubes of the expanded end, beaded and barbed type.

BRIEF DESCRIPTION OF THE DRAWINGS

For a fuller understanding of the nature and objects of the invention, reference should be had to the following detailed description taken in connection with the accompanying drawings, in which.

DESCRIPTION OF A PREFERRED EMBODIMENT

Figure 1:
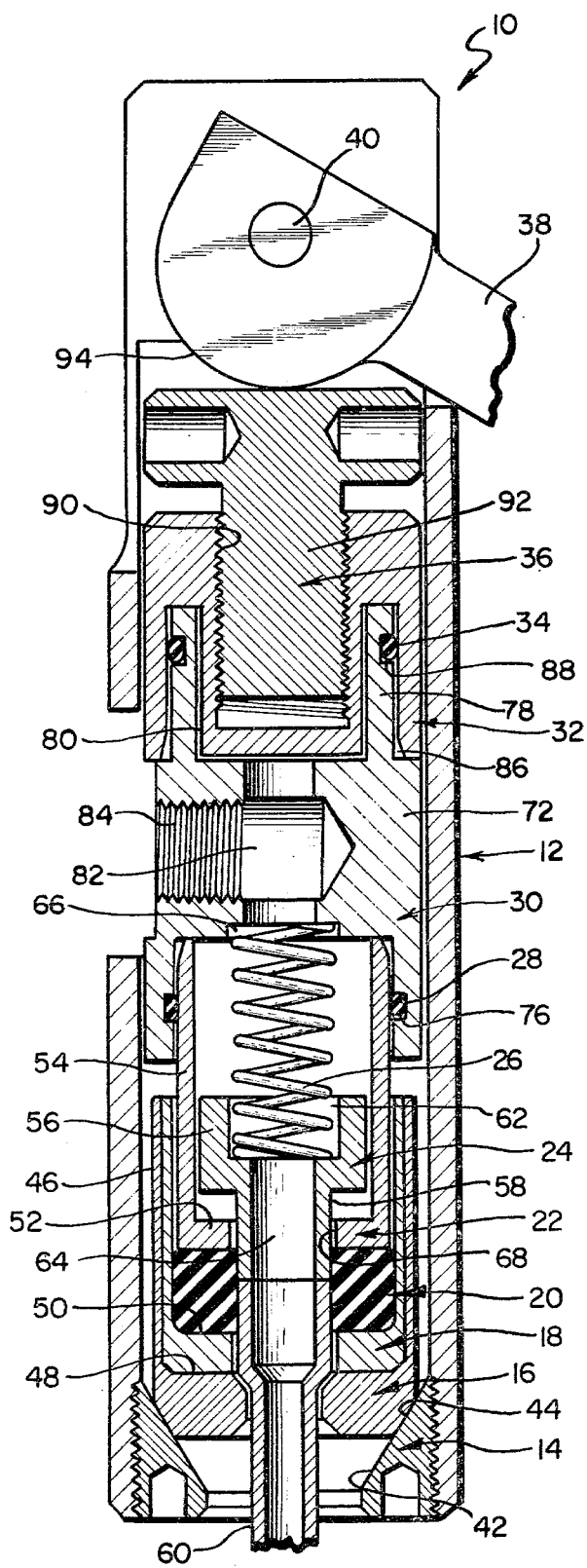
FIG. 1 is a sectional view taken longitudinally through a fitting exemplary of the invention, with the fitting in its operated position.
Figure 2:
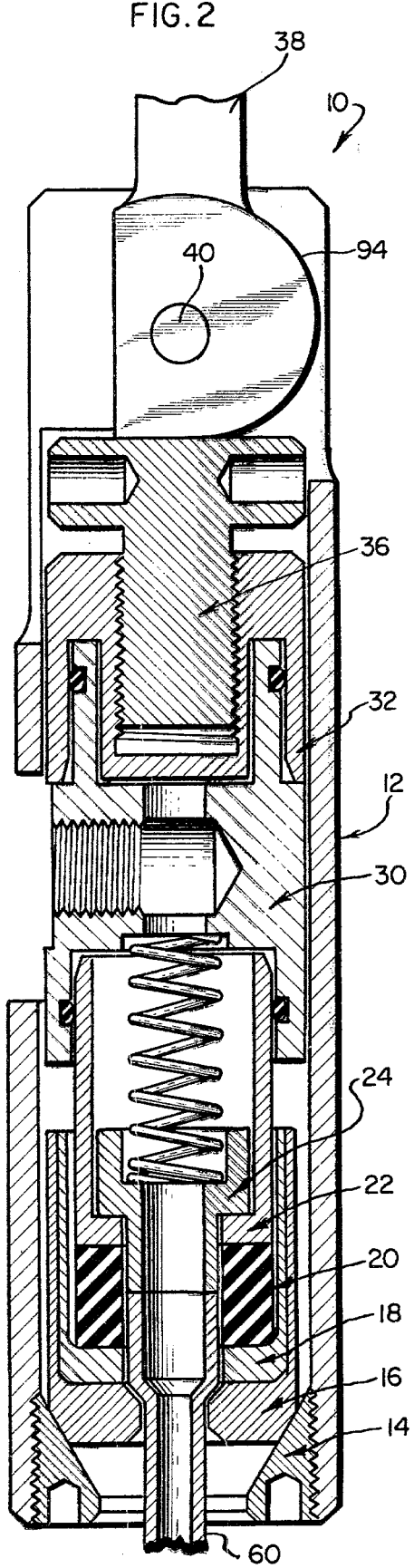
FIG. 2 is a sectional view similar to FIG. 1, with the fitting in its inoperative position.

Referring now to the drawings, in FIGS. 1 and 2 a tube fitting 10 is illustrated which comprises a generally hollow cylindrical-shaped body 12 having a head 14 threadedly received in one end thereof. The head 14 has a cam surface 42 on it which is complimentary with and is engaged by a cam surface 44 on a split collet 16 which is longitudinally slidably retained within the body 12 of the fitting 10. The split collet 16 is of a generally hollow cylindrical shaped having a side wall 46 and a bottom wall 48.

A retainer 18 having a diameter substantially corresponding to the inside diameter of the split collet 16 is disposed within the split collet 16 and seats on its bottom wall 48. The retainer 18 has a bottom wall 50 which forms a shoulder or seat for a resilient, compressible seal 20. A generally hollow cylindrical shaped adapter 22 having a bottom wall 52 and side wall 54 is slidably received within the retainer 18, with its bottom wall 52 seated atop the seal 20. Its side wall 54 is of a length to extend a substantial distance above the upper edge of the side walls of the split collet 16 and the retainer 18.

A tube stop 24 having a body portion 56 of a diameter substantially corresponding to the inner diameter of the adapter 22 and a reduced diameter portion 58 is slidably disposed and retained within the adapter 22. The reduced diameter portion 58 of the tube stop 24 is of a diameter to correspond with the diameter of the expanded end of the tube 60 to which the fitting 10 is affixed. The tube 24 has a recessed cavity 62 in its body portion 56, and this recessed cavity 62 is in open communication with a passageway 64 through the reduced diameter portion 58. One end of a helical spring 26 seats within the recessed cavity 62 in the tube stop 24, and its other end is retained within a recessed cavity 66 formed in an insert 30, which forms part of a piston assembly including the insert 30, a piston 32 and an adjustable screw 36. Normally, the helical spring 26 bears against the tube stop 24 to bias it downwardly in the adapter 22 so that it seats on the bottom wall 52 thereof, with the reduced diameter portion 58 extending through an aperture 68 in the bottom wall 52 of the adapter 22 and an aperture 70 in the seal 20, as generally illustrated in FIG. 2.

The piston assembly, as indicated above, includes an insert 30, which has a generally cylindrical shaped body portion 72 from which depends on annular skirt 74 which surrounds the side wall 54 of the adapter 22. An annular quad seal 28 is retained within a cavity 76 formed in the annular skirt 74, and provides a seal between the adapter 22 and the insert 30, for reasons set forth more specifically below. An annular wall 78 is provided atop the body portion 72 of the insert 30 and forms a cavity 80 atop the insert 30. The body portion 72 of the insert 30 also has provided therein a fluid passageway 82 which is in open communication with the cavity 80 and also the passageway through the adapter 22 and the tube stop 24. The fluid passageway 82 also has a threaded portion 84 for receiving an external connection for providing fluid to the fitting 10.

The piston 32 has an annular groove 86 formed in it for receiving therein the annular wall 78 of the insert 30. A quad seal 34 is disposed in a peripheral groove 88 in the annular wall 78 to provide a seal between the insert 30 and the piston 32. The piston 32 has a threaded cavity 90 formed in it for receiving the threaded shaft portion 92 of the adjustable screw 36.

A handle 38 is pivotally affixed to the upper end of the body 12 by means of a pivot pin 40. The handle 38 has a cam surface 94 on it which is engageable with the top wall of the adjustable screw 36 when the handle 38 is pivotally operated, as more particularly described below. Also, when in its operative position, the handle 38 is disposed in an overcenter locking position which effectively prevents the fitting from being accidentally or inadvertently released when affixed to a tube for testing.

In affixing the fitting 10 to a tube 62 to be tested, initially the handle 38 is operated to its inoperative position, as illustrated in FIG. 2. The tube 60 then is inserted into the tool with its terminal end abutted against the terminal end of the tube stop 24 such that the split collet 16 will grip behind the expanded portion of the tube 60 when it is operated. As indicated above, the reduced diameter portion 58 of the tube stop preferably and advantageously is of the same diameter as the diameter of the expanded portion of the tube 60. In this fashion, the end of the tube 60 is effectively sealed by the reduced diameter portion 58 of the tube stop. Also, the tool 10 will accept wide variations in expanded end lengths of the tube 60, since the tube stop is resiliently biased by the spring 26. Accordingly, when the tube 60 is inserted into the tool 10, the tube stop 24 is simply retracted into the adapter 22 to accommodate the expanded end of the tube 60.

Once the tube is inserted within the fitting 10, the handle 38 is operated to engage its cam surface 94 with the top wall of the adjustable screw 36 of the piston assembly, to the locked position illustrated in FIG. 1. As the handle 38 is pivotally operated, the piston assembly, including the adjustable screw 36, the piston 32 and the insert 30 engage and assert pressure on the adapter 22. As the adapter 22 is forcible urged downwardly longitudinally in the body 12 of the fitting 10, the seal 20 is compressed into sealing engagement with the tube 60. Simultaneously, as the seal 20 is compressed, the retainer 18 is forcibly urged into contact with the bottom wall 48 of the split collet 16, and forces the collet 16 longitudinally downwardly within the body 12 of the fitting 10. As the collet 16 is forcibly urged downwardly, its cam surface 44 engages with the cam surface 42 on the head 14 to force the collet 16 into gripping engagement with the tube 60, behind the expanded end of the tube 60. Accordingly, as is apparent, the tube 60 is gripped behind the expansion by the collet 16 and also is sealed on its outside diameter by the seal 20 to provide a positive gripping and sealing action.

When charging or evacuating compressor tubing or expanded end headers on condensors or evaporator systems, for example, an external fitting is threadedly affixed to the fitting 10 by threading the external fitting into the insert 30 by means of the threaded portion 84 which accepts the external fitting. Accordingly, when charging or evacuating such systems, fluid flows through the tubing 60, the passageway 64 in the tube stop 24, the adapter 22, and the fluid passageway 82, through the external fitting to the fluid source. It may be noted that maximum fluid flow through the tube is achieved since the diameter of the reduced diameter portion 58 of the tube stop 24 corresponds with the diameter of the expanded end of the tube 60. Also, the fitting 10 is of a pressure-assist design that furnishes increased sealing and gripping action with increase in system pressure. More particularly, it can be seen that fluid flowing through the fitting 10 flows through the passageway 82, and against the piston 32, and between the sidewalls of the tube stop 24 and the adapter 22, so that the fluid pressure is asserted against both the piston 32 and the adapter 22. Accordingly, this fluid pressure effectively increases the pressure asserted upon the annular seal 20 to compress it against the outer wall of the tube 60 and also on the collet 16 to cause it to more securely grip the outside diameter of the tube 60. The seals 28 and 34 prevent loss of the fluid flowing through the fitting 10. The pressure asserted on the annular seal 20 and the collet 16 likewise can be increased or decreased by rotatably adjusting the adjustable screw 36 to thread it into or out of the piston 32.

Figure 3:
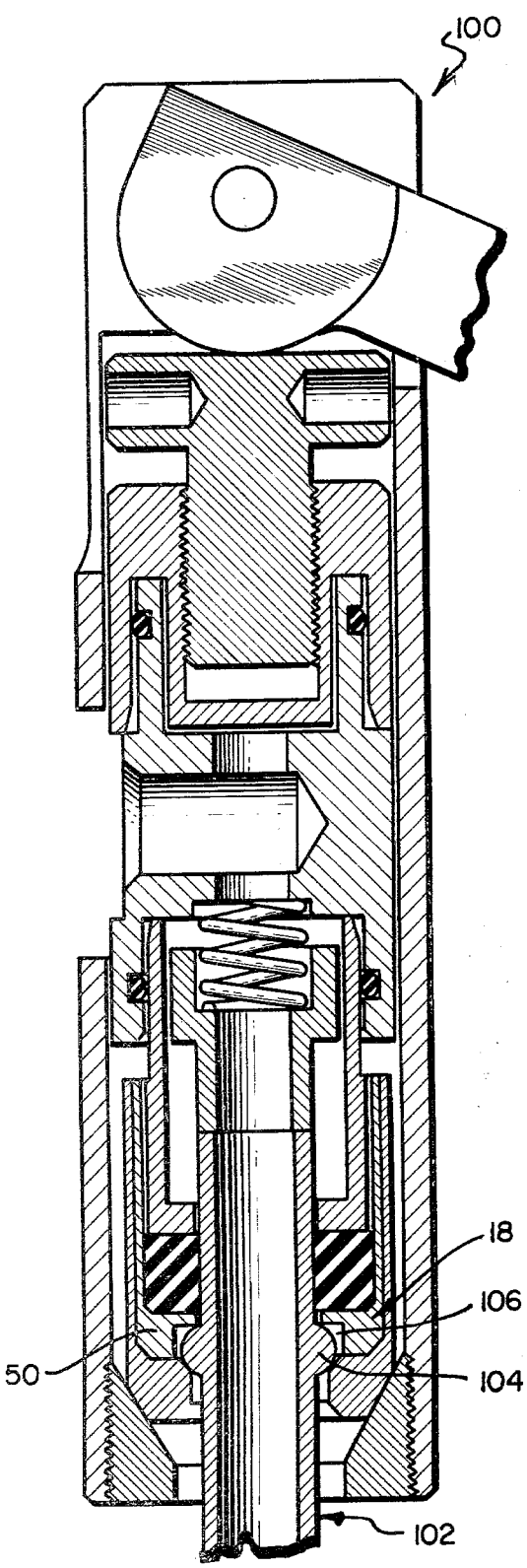
FIG. 3 is a sectional view taken longitudinally through a similar fitting exemplary of another embodiment of the invention, with the fitting in its operated position.
Figure 4:
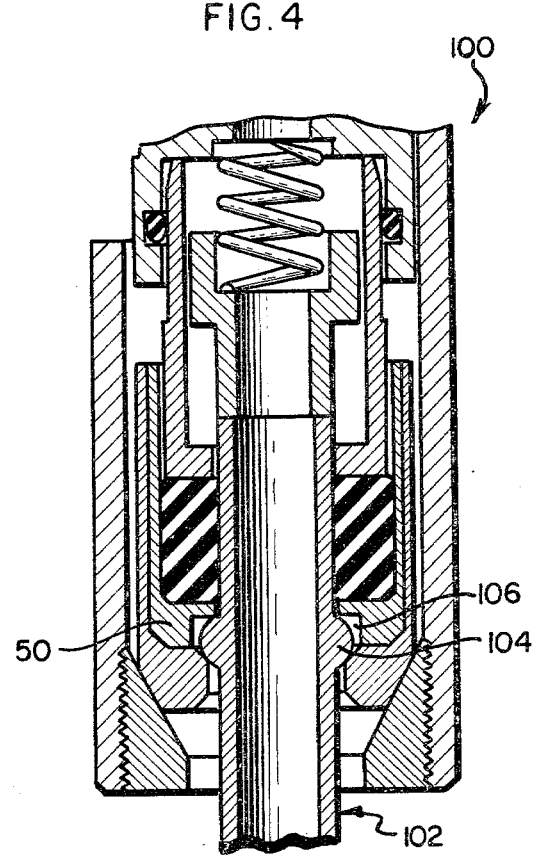
FIG. 4 is a partial sectional view taken longitudinally through the fitting of FIG. 3; with the fitting in its inoperative position.

In FIGS. 3 and 4, there is illustrated a tube fitting 100 which is substantially like the tube fitting 10. The only principal distinction between the two fittings 10 and 100 is a slight modification in the construction of the retainer 18 which permits the tube fitting 100 to accept the bead 104 on the end of a beaded tube 102.

In particular, in the case of the fitting 100, it may be noted that a recessed cavity 106 is provided in the underside of the bottom wall 50 of the retainer 18. The diameter of the recessed cavity 106 is proportioned to receive therein the bead 104 on the beaded end tube 102 when the latter is inserted within the tool 100.

The fitting 100, like the fitting 10, is designed to accept wide variation in length from the bead 104 to the end of the beaded end tube 102. As in the case of the tube fitting 10, the terminal end of the tube 102 abuts against the terminal end of the tube stop 24 as the tube 102 is inserted within the tool 100. The variation in length from bead 104 to the terminal end of the tube 102 is compensated for by the tube adapter 24 which is retracted into the adapter 22. The spring 26 is compressed as the tube stop 24 is retracted into the adapter 22, and retains the end of the tube stop in sealing engagement with the end of the tube 102 during operation.

The tube fitting 100 is affixed to the tube 102 to be tested, in the same manner as the tube fitting 10. More particularly, initially the handle is operated to its inoperative position. The tube 102 then is inserted into the tool with its terminal end abutted against the terminal end of the tube stop 24 in such a manner that the split collet 16 will grip behind the bead 104 on the tube 102 when it is operated. As indicated above, the reduced diameter portion 58 of the tube stop preferably and advantageously is of the same diameter as the diameter of the tube 102, so that the end of the tube 102 is effectively sealed by the reduced diameter portion 58 of the tube stop.

Once the tube is inserted within the fitting 100, the handle 38 is operated to engage its cam surface 94 with the top wall of the adjustable screw 36 of the piston assembly, to the locked position, as described above. In doing so, the piston assembly engages the asserts pressure on the adapter 22, which is forcibly urged downward longitudinally in the body 12 of the fitting 100 to compress the seal 20 into sealing engagement with the tube 102. The split collet 16 likewise is longitudinally downwardly displaced, and the collet 16 is forced into gripping engagement with the tube 102, behind the bead 104. The fitting 100 likewise has a pressure assist design, as described above in the case of the tube fitting 10.

Figure 5:
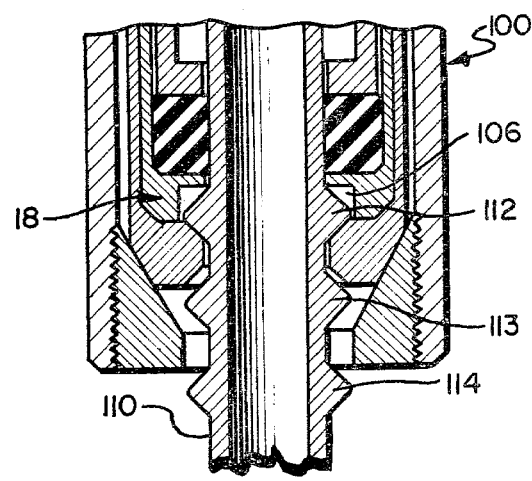
FIG. 5 is a partial sectional view taken longitudinally through a similar fitting exemplary of another embodiment of the invention, illustrating the manner in which the fitting is affixed to a barbed end tube.

The tube fitting 100 also is adaptable for use with barbed end tubes, as illustrated in FIG. 5. In this case, a barbed end tube 110 having spaced apart barbs 112, 113 and 114 thereon is inserted within the tube fitting 100 until the barb 112 seats within the recessed cavity 106 in the retainer 18, substantially in the same manner as the bead 104 is seated within the recessed cavity 106. Again, a wide variation in the length from the barb 112 to the end of the tube 110 is accommodated, by means of a retractable tube stop 24.

In this case, when the tube fitting 100 is operated, the annular seal 20 is compressed into sealing engagement against the outside diameter of the tube 110, and the split collet 16 is operated to grip the outside diameter of the tube 110, behind the barb 112 and between the barbs 112 and 113, as illustrated. When utilized in conjunction with a barbed end tube, the fitting 100 provides all of the features and advantages of the tube fitting 10 and the tube fitting 100 when utilized in conjunction with a beaded end tube.

In the case of each of the tube fittings 10 and 100, the handle 38 is simply pivotally operated to its inoperative position with respect to the body 12, i.e., such that the handle 38 is effectively longitudinally aligned with the body 12, to release the fittings from the tubes being tested. The collet 16 returns automatically to its initial position to release its grip on the tube, and the tube is effectively ejected from the fitting by the action of the spring 26 asserting pressure on the tube stop 24 which action, in turn, asserts pressure on the end of the tube.

Assembly of the tube fittings 10 and 100 is relatively simple. The component parts of the fittings are simply progressively assembled as illustrated, and then slidably inserted within the cylindrical body 12 of the fittings. The component parts of the fitting are then secured therein by simply threading the head 14 into the terminal end of the body 12. The fittings 10 and 100 likewise are easily disassembled for repair or servicing, simply by threadedly removing the head 14 and slidably displacing the component parts out of the body 12.

Accordingly, from the above description, it can be seen that improved fittings for mounting to the ends of smooth wall tubes, particularly smooth wall tubes of expanded end, beaded and barbed types is provided. The tube fittings are easily adapted to accept a wide range of outside tube diameters, and also will accept wide variations in length from bead to the end of the tube and in expanded end lengths.

It will thus be seen that the objects set forth above, among those made apparent from the preceding description, are efficiently attained and certain changes may be made in the above article. Accordingly, it is intended that all matter contained in the above description and shown in the accompanying drawings shall be interpreted as illustrative and not in a limiting sense.

Now that the invention has been described, what is claimed as new and desired to be secured by Letters Patent is:

1. A fitting for mounting to the ends of smooth wall tubes for leak testing expanded end tubes, beaded end tubes and barbed end tubes, said fitting comprising a generally cylindrical-shaped hollow body having retained therein a split collet having a bottom wall and a cam surface on the outer peripheral edge of said bottom wall, a retainer having a bottom wall disposed within said split collet, an adapter having a bottom wall disposed within said retainer, a seal disposed between the bottom walls of said retainer and said adapter, said seal and the bottom walls of said split collet, said retainer and said adapter each having therein an aperture for receiving therethrough the end of a tube to be tested, a tube stop disposed within said adapter engageable by the terminal end of the tube to be tested, a piston assembly engageable with said adapter to longitudinally reciprocate said adapter to compress said seal in sealing engagement with a tube to be tested and to operate said split collet to grip the outside diameter of said tube, and a head threadedly retained in a tube receiving end of said hollow body having a cam surface thereon complimentary with and engageable with said cam surface of said split collet to operate said split collet; and a handle at the other end of said hollow body having a cam surface thereon operable to longitudinally reciprocate said piston assembly when said handle is operated.

2. The fitting of claim 1, further comprising spring means disposed between said piston assembly and said tube stop, whereby said tube stop is longitudinally resiliently retractable in said adapter to thereby permit wide variations in length from bead to end of tube and in expanded end lengths.

3. The fitting of claim 2, wherein said tube stop comprises a body portion of a diameter substantially corresponding to the diameter of said adapter and a cylindrical-shaped end portion of a diameter corresponding to the diameter of the tube to be tested, said end portion being extendable through said apertures in said adapter, said seal and said retainer, said tube stop being retractable into said adapter when the terminal end of a tube to be tested is forcibly engaged with said end portion and the tube is forcibly urged into said fitting, to thereby permit wide variations in length from bead to end of tube and in expanded end lengths.

4. The fitting of claim 3, wherein said piston assembly further comprises a skirt portion disposed about and in sealed engagement with said adapter, said piston assembly and said tube stop have a fluid passageway in them in communication with the open terminal end of the tube being tested, and an opening in said body whereby external means can be coupled to said fluid passageway to provide a fluid flow to and from said fitting and the tube being tested.

5. The fitting of claim 3, wherein said retainer is provided with a recessed cavity in the outer wall of said bottom wall for receiving therein a bead on a tube, said split collet upon being operated locking behind said bead to secure said fitting to said tube.

6. The fitting of claim 3, wherein said piston assembly comprises an insert slidably retained within said body having a bottom wall engageable with said adapter, a skirt portion depending about said adapter, a top wall and a hollow cylindrical-shaped extension extended longitudinally from said top wall; and a piston slidably retained within said body having a top wall and a bottom wall, an annular recessed cavity in said bottom wall proportioned to receive therein said cylindrical-shaped extension of said insert.

7. The fitting of claim 6, further comprising a fluid passageway in said insert and said tube stop in communication with the open terminal end of the tube being tested; an opening in said body whereby external means can be coupled to said fluid passageway to provide a fluid flow to and from said fitting and the tube being tested; and sealing means disposed between said insert and said adapter and between said insert and said piston.

8. The fitting of claim 7, further comprising an adjusting screw threadably and adjustably retained within the top wall of said piston and engageable by the cam surface of said handle, said adjusting screw being threadedly adjusted to increase and decrease the compression pressure exerted on said seal disposed between the bottom walls of said retainer and said adapter.

* * * * *